June 29, 1937.  H. C. RENTSCHLER  2,085,672
PHOTOELECTRIC TUBE
Filed March 1, 1935
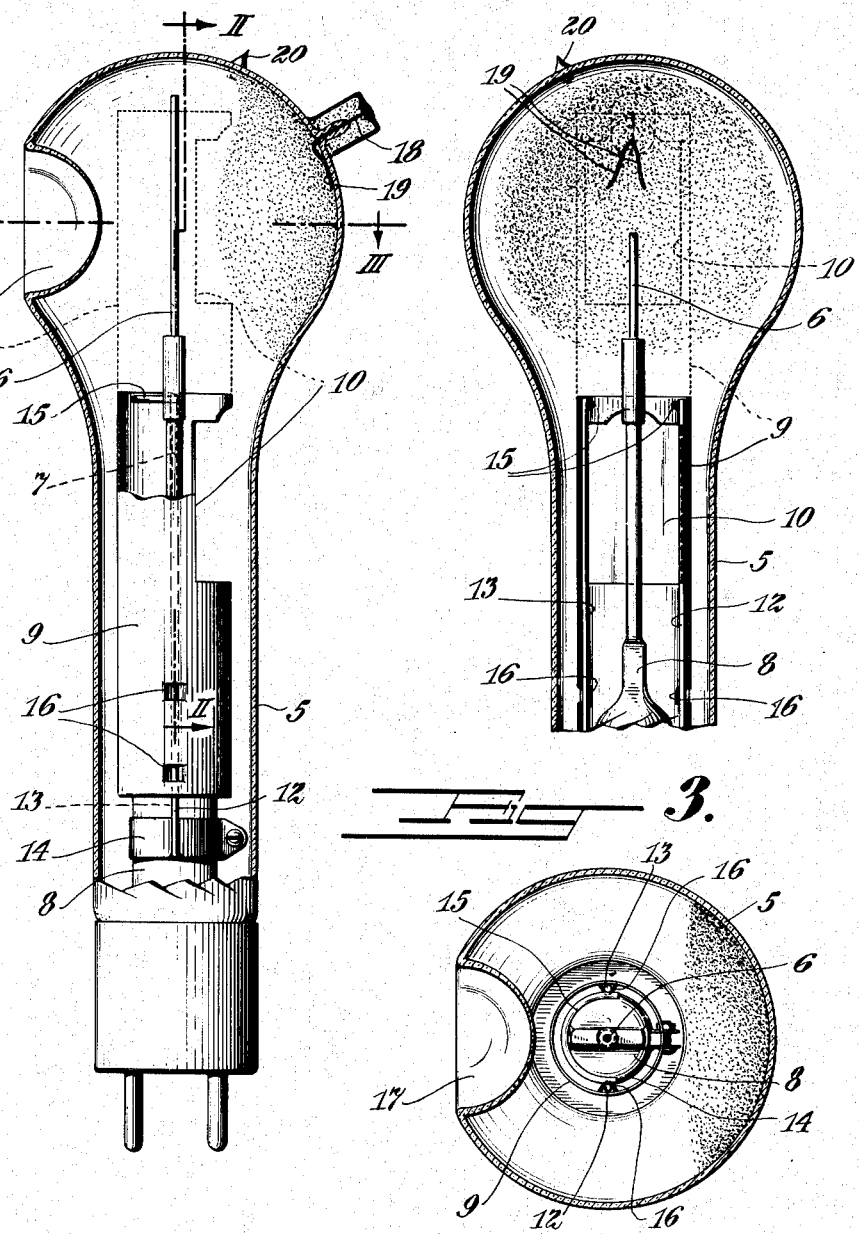
INVENTOR
H. C. RENTSCHLER.
BY M. F. Peges
ATTORNEY Patented June 29, 1937

2,085,672

UNITED STATES PATENT OFFICE 2,085,672

PHOTOELECTRIC TUBE

Harvey Clayton Rentschler, East Orange, N. J., assignor, by mesne assignments, to Westinghouse Electric and Manufacturing Company, East Pittsburgh, Pa., a corporation of Pennsylvania Application March 1, 1935, Serial No. 8,815

2 Claims. (Cl. 250—27.5)

My invention relates to photo electric tubes and more particularly to a tube which is sensitive to only a definite band within the ultra violet region of the spectrum.

Tubes of this general type are well known in the art which are responsive to the blue region of the spectrum and extending into the ultra violet region. Heretofore, however, such tubes, due to the particular electrode, have been confined more or less to a definite minimum wave length substantially no lower than 2000 Angstrom units. It is now a well recognized fact that ultra violet radiations having wave lengths of 2000 Angstrom units and less have a highly beneficial result particularly in the resulting sterilizing effect inhibiting septicemia and inflammation in open wounds as contrasted with the sterilizing action of ultra violet radiations having wave lengths between 2500 and 3000 Angstrom units in prohibiting bacteria and fungous action. Moreover radiations of very short wave length such as those below about 2000 Angstrom units will produce bactericidal and fungicidal action without a blistering effect. Due to these inherent characteristics of the ultra violet it is highly desirable to ascertain whether a particular ultra violet source is generating a substantial amount of radiations having wave lengths of 2000 Angstrom units and less.

It is accordingly an object of my present invention to provide a photo electric tube which is non-sensitive to the entire visible and longer ultra violet spectrum and in which the photo electric effect starts in the lower region of the ultra violet and is confined to a comparatively narrow band within this lower region.

Another object of my present invention is to provide a photo electric tube which is sensitive only to ultra violet light having a wave length below approximately 2000 Angstrom units.

A further object of my present invention is to produce a relatively inexpensive photo-electric tube for measuring the lower wave bands of the ultra violet spectrum.

Still further objects of my present invention will become obvious to those skilled in the art by reference to the accompanying drawing wherein, Figure 1 shows an elevational view with parts of the photo electric tube broken away to better illustrate the structural details thereof.

Fig. 2 is an elevational view in section taken on the line II—II of Fig. 1, and

Fig. 3 is a sectional view taken on the line III—III of Fig. 1.

Heretofore in the construction of photo electric tubes for measuring radiations in the ultra violet region various metals have been employed all of which, however, have a photo electric threshold which is non-responsive to radiations below 2000 Angstrom units. In accordance with my present invention I have definitely established that platinum has a maximum photo electric threshold of approximately 2000 Angstrom units, that is to say, such metal when employed in a photo electric tube has a photo electric effect only to wave lengths of approximately 2000 Angstrom units and lower and is non-sensitive to longer wave lengths.

Although ultra violet lamps as constructed at the present time may generate radiations extending from as low as 1000 to approximately 4000 Angstrom units and higher when such radiations are permitted to fall upon a photo electric tube sensitive to radiations lying within the spectral region between 2000 and 4000 Angstrom units the tube naturally responds to such radiations and while radiations having a wave length of 2000 Angstrom units and less may be generated, the test to which such source is subjected in no way indicates the effective radiations below 2000 Angstrom units. It is also significant to note that in mercury discharges the radiations below 2300 Angstrom units are substantially negligible until the wave lengths of 1960 Angstrom units and 1849 Angstrom units are reached which in themselves are highly bactericidal and septicema preventing.

I have found that by constructing a photo electric tube, as hereinbefore mentioned, when the cathode is formed of platinum, which may be in the form of a thin electrode, as by sputtering of chemically pure platinum on the interior walls of the envelope, such tube is responsive to radiations of only approximately 2000 Angstrom units and lower and is entirely non-sensitive to radiations of longer wave lengths. Accordingly when such photo electric tube is subjected to radiations from an ultra violet source, such tube being non-responsive to radiations of 2000 Angstrom units and longer thus indicates only the radiations emanating from the ultra violet source lying below 2000 Angstrom units and thus a true and accurate measurement of such wave lengths may be obtained.

Referring now more particularly to the drawing in detail I have shown in Figure 1 a photo electric tube comprising an envelope 5 composed of a material which is transparent to ultra violet light, such for example as quartz or a borosilicate glass substantially free from iron and commercially known as Corex D, or any other ultra violet transmitting glasses responsive to known regions of the ultra-violet spectrum, having a portion thereof less absorbent to ultra violet than the remainder of the envelope.

Rigidly mounted within the envelope 5 is a rod shaped anode 6 which is preferably formed of platinum and is supported by a leading-in conductor 7 sealed into the envelope and extending through the press portion 8 thereof as is well known in the art. A metallic shield 9 comprising substantially a cylinder provided with a semi-circular opening 10 extending longitudinally thereof an appreciable distance is mounted upon a frame consisting of two parallel longitudinally extending wires 12 and 13 welded or otherwise affixed to a collar or the like 14, engaging the press portion 8 of the envelope. This shield 9 is electrically connected by means of a conductor (not shown) which extends through the press portion 8 of the envelope in order that an electrical potential may be applied thereto during manufacture of the tube as hereinafter explained.

A semi-circular rod or brace 15 is suitably affixed, as by welding or the like, to the upper extremities of the supporting rods 12 and 13 and the shield itself is provided with lateral extensions 16 to form a guide whereby the shield may be moved longitudinally upon the support rods 12 and 13.

In order to decrease the absorption of the short ultra violet by the envelope the latter is provided with a thin window 17 which is formed by heating a portion of the envelope and drawing in such portion to form a reentrant bulbous portion having a thin dome. Such window increases the current output of the tube appreciably, particularly in the lower wave length regions of the spectrum, the total increase in photo electric current from the tube when subjected to a strong source of ultra violet being several times greater than when the window is not employed.

In the initial process of manufacture the shield 9 is moved upon the support rods 12 and 13 by inverting the tube so that the shield assumes a position which totally surrounds the platinum anode 6, as shown by the dotted lines in Fig. 2, with the opening 10 being disposed rearwardly of the thin window 17 for a purpose to be hereinafter more fully explained.

After the electrode assembly has been sealed into the envelope the latter is baked out and exhausted in the usual manner and the shield 9 degassified by high frequency induction heating. A filling of a gaseous medium which has substantially no affinity for platinum, such as argon, neon or helium, is then introduced into the envelope through the usual exhaust stem (not shown) extending through the press portion of the envelope, with this medium being at a pressure of approximately 2 mm. which I find produces satisfactory results. A suitable voltage of substantially low potential approximating several hundred volts is then applied between the shield 9 and the platinum anode 6, which latter now acts as a cathode with the shield functioning as anode. This accordingly causes a discharge between the platinum anode 6 now functioning as cathode and the shield 5 accompanied by a sputtering of the platinum electrode 6.

The shield, however, totally surrounding the electrode 6 prevents the sputtered material from collecting on the glass walls of the envelope except that portion immediately adjacent the opening 10 with the result that this region of the envelope immediately in back of the reentrant thin window 17 causes a sputtered deposit of chemically pure platinum to accumulate thereon due to the fact that the gaseous medium employed has no affinity for the platinum and also precludes the formation of an oxide or other compounds. This discharge is continued for a sufficient period of time to entirely clean the electrode 6. After the electrode 6 has become thoroughly cleaned and a substantial layer of chemically pure platinum has been sputtered upon a portion of the envelope immediately in the rear of the thin window the shield 9 is moved to the position shown in Figure 1 and the potential removed from the shield 9. A leading-in conductor 18, preferably formed of tungsten or the like is sealed into the wall of the envelope and welded or otherwise affixed thereto is a platinum wire 19 bearing against the interior surface of the envelope. Such leading-in conductor 18 and wire 19 are naturally positioned in the envelope prior to sputtering so as to establish a good electrical contact with the sputtered layer of platinum, which thus forms the cathode electrode for the photo electric tube.

If it is desired to employ the tube with the gaseous filling the same may be left therein or in the event it is desired to evacuate the gas filling the same may be exhausted by pumping off the gaseous filling and sealing the envelope at the tip 20. It thus becomes readily obvious to those skilled in the art that I have provided a photo-electric tube wherein the cathode electrode is formed of chemically pure platium, which is sputtered upon the interior surface of the envelope.

Moreover, such electrode may be formed by a layer of pure platinum in lieu of the sputtered surface and inasmuch as this metal has a photoelectric threshold responsive to ultra violet radiations having a wave length less than 2000 Angstrom units and non-responsive to longer wave lengths such cell may be utilized for measuring ultra violet radiations of wave lengths of less than 2000 emanating from a suitable source.

The particular composition of the envelope together with the decreased absorption due to the thin window provided in the envelope renders such tube extremely sensitive to ultra violet radiations of wave lengths less than 2000 Angstrom units.

Although I have shown and described one specific embodiment of my invention and have specified the cathode electrode as being composed of platinum it is to be understood that other modifications of my invention may be made and that other metals may be employed for the cathode electrode provided the same have a photo electric threshold of approximately 2000 Angstrom units, without departing from the spirit and scope of the appended claims.

What is claimed:

1. The method of constructing a photo-electric tube provided with an electrode having a photo-sensitive threshold not greater than 2000 Angstrom units, which consists in sputtering a layer of platinum upon the interior wall of the envelope of the tube by the passage of an electrical discharge between the electrodes of the tube in the presence of a gaseous medium at a substantial pressure having no affinity for the sputtered platinum in order that the deposited layer thereof is in a chemically pure state free of occluded gases or surface films having a photo-sensitive threshold not greater than 2000 Angstrom units.

2. The method of constructing a photo-electric tube provided with an electrode having a photo-sensitive threshold not greater than 2000 Angstrom units which consists in sputtering a layer of platinum upon the interior wall of the envelope by the passage of an electrical discharge between the electrodes of the tube in the presence of a gaseous medium at a pressure of about 2 mm. having no affinity for the sputtered platinum in order that the deposited layer thereof is in a chemically pure state free of occluded gases or surface films having a photo-sensitive threshold not greater than 2000 Angstrom units.

HARVEY CLAYTON RENTSCHLER.